(12) United States Patent
Fink

(10) Patent No.: US 10,794,509 B2
(45) Date of Patent: Oct. 6, 2020

(54) VALVE CARTRIDGE FOR A MAGNET VALVE, AND CORRESPONDING MAGNET VALVE

(71) Applicant: Robert Bosch GmbH, Stuttgart (DE)

(72) Inventor: Reinhard Fink, Schwetzingen (DE)

(73) Assignee: Robert Bosch GmbH, Stuttgart (DE)

( * ) Notice: Subject to any disclaimer, the term of this patent is extended or adjusted under 35 U.S.C. 154(b) by 37 days.

(21) Appl. No.: 16/301,005

(22) PCT Filed: Mar. 23, 2017

(86) PCT No.: PCT/EP2017/056944
§ 371 (c)(1),
(2) Date: Nov. 13, 2018

(87) PCT Pub. No.: WO2017/198373
PCT Pub. Date: Nov. 23, 2017

(65) Prior Publication Data
US 2019/0178407 A1    Jun. 13, 2019

(30) Foreign Application Priority Data
May 17, 2016    (DE) .......................... 10 2016 208 414

(51) Int. Cl.
*F16K 31/06* (2006.01)
*B60T 8/36* (2006.01)

(52) U.S. Cl.
CPC ...... *F16K 31/0655* (2013.01); *F16K 31/0693* (2013.01); *B60T 8/363* (2013.01)

(58) Field of Classification Search
CPC ... F16K 31/0655; F16K 31/0693; B60T 8/363
See application file for complete search history.

(56) References Cited

U.S. PATENT DOCUMENTS 8,651,453 B2 * 2/2014 Heyer ..................... B60T 8/363
  251/129.02
9,441,754 B2 * 9/2016 Courth ..................... B60T 8/363
(Continued)

FOREIGN PATENT DOCUMENTS

DE       199 49 222 A1    4/2001
DE    10 2006 004 530 A1    8/2007
(Continued)

OTHER PUBLICATIONS

International Search Report corresponding to PCT Application No. PCT/EP2017/056944, dated May 12, 2017 (German and English language document) (6 pages).

*Primary Examiner* — Matthew W Jellett
(74) *Attorney, Agent, or Firm* — Maginot, Moore & Beck LLP

(57) ABSTRACT

A valve cartridge for a magnet valve has a capsule, an armature movable within the capsule, a valve insert, and a valve body. One end of the valve insert inserted into the capsule, and a valve seat of the valve body inserted into a second end of the valve insert. The armature moves a plunger within the valve insert. The plunger has a base body and a closing body. A closing element of the closing body sealingly plunges into the valve seat. The base body includes an equalization groove, which enables volume equalization between a sealing region and an armature chamber. The plunger has a closed cylindrical outer contour on the end thereof facing the armature, which forms a radial guide of the plunger in the valve insert, and an axial recess, which overlaps with the equalization groove and is connected to the armature chamber via a radial recess.

9 Claims, 4 Drawing Sheets

(56) References Cited

U.S. PATENT DOCUMENTS

| | | | |
|---|---|---|---|
| 2007/0176136 A1* | 8/2007 | Speer | B60T 8/363 |
| | | | 251/321 |
| 2009/0183698 A1* | 7/2009 | Burssner | F16K 31/0655 |
| | | | 123/41.08 |
| 2010/0308245 A1 | 12/2010 | Fink et al. | |
| 2015/0137014 A1 | 5/2015 | Sato et al. | |

FOREIGN PATENT DOCUMENTS

| | | |
|---|---|---|
| DE | 10 2007 053 300 A1 | 5/2009 |
| DE | 10 2009 026 853 A1 | 12/2010 |
| DE | 10 2012 207 986 A1 | 11/2013 |
| JP | 2004-360748 A | 12/2004 |

* cited by examiner

VALVE CARTRIDGE FOR A MAGNET VALVE, AND CORRESPONDING MAGNET VALVE

This application is a 35 U.S.C. § 371 National Stage Application of PCT/EP2017/056944, filed on Mar. 23, 2017, which claims the benefit of priority to Serial No. DE 10 2016 208 414.3, filed on May 17, 2016 in Germany, the disclosures of which are incorporated herein by reference in their entireties.

BACKGROUND

The disclosure starts from a valve cartridge for a magnet valve of the type described below. The present disclosure also relates to a magnet valve having a valve cartridge of this kind.

In normally open magnet valves, a plunger having a closing element is employed as a sealing element. The plunger guide is generally embodied as a cloverleaf profile having a plurality of webs and recesses. The recesses between the webs are intended to ensure volume equalization between a sealing region of the valve and an armature chamber. The webs themselves are intended to limit the tilting angle between the valve insert and the plunger. As long as the valve insert has only small partial deviations from circularity, which are smaller than the web width in the circumferential direction, this is also effective. If the range is larger, the plunger can tilt locally to a greater extent at this location. However, the tilting angle has an effect on the pressure adjustment accuracy and the variation and/or reproducibility thereof.

DE 10 2009 026 853 A1, for example, discloses a valve cartridge which comprises a sleeve, a valve insert connected to the sleeve, a valve armature, which is guided in an axially movable manner between a closed position and an open position within the sleeve against the force of a return spring and is coupled to a plunger having a closing geometry, and a valve body, which is connected to the valve insert and has a valve seat, which is arranged between at least one first fluid opening and at least one second fluid opening. In the closed position, the closing geometry interacts in a sealing manner with a seat geometry of the valve seat and interrupts a fluid flow between the at least one first fluid opening and the at least one second fluid opening. In the open position, the closing geometry is raised from the valve seat and allows fluid flow between the at least one first fluid opening and the at least one second fluid opening.

SUMMARY

The valve cartridge for a magnet valve having the features described herein has the advantage that tilting of the plunger can be limited, even in the case of relatively large partial deviations from circularity, by means of the encircling cylindrical outer contour on an end of the plunger facing the armature. Moreover, embodiments of the valve cartridge according to the disclosure are more robust in relation to manufacturing tolerances. This advantageously applies to the pressure adjustment accuracy, the variation thereof due to component tolerances, and reproducibility in one and the same valve cartridge. The volume equalization between a sealing region and an armature chamber continues to be ensured in an advantageous way by an axial recess, which has an overlap with at least one equalization groove in the main body and is connected to the armature chamber via at least one radial recess.

The cylindrical outer contour arranged at the end of the plunger restricts the range of motion radially over the entire circumference. This results in more accurate guidance of the plunger in the valve insert in an advantageously improved manner. The constriction of the cross section in the guiding region of the cylindrical outer contour advantageously has no effect on the switching speed, owing to the volume equalization.

In the case of embodiment as an injection-molded plastic part, the design of the plunger can be produced using the existing machines and mold concepts. All that is required is a simple adaptation of the mold cavities and validation of the injection process.

Embodiments of the present disclosure make available a valve cartridge for a magnet valve which comprises a capsule, an armature, which is movably guided within the capsule, a hollow-cylindrical valve insert, a first end of which is inserted into the capsule, and a valve body having a primary valve seat, which is inserted into a second end of the hollow-cylindrical valve insert. The armature moves a plunger guided within the valve insert, said plunger having a main body and a closing body having a closing element, which plunges into the primary valve seat of the valve body in a sealing manner in order to carry out a sealing function. At least one equalization groove is introduced into the main body of the plunger, said groove enabling a volume equalization between a sealing region and an armature chamber. In this arrangement, the plunger has, at its end facing the armature, an encircling cylindrical outer contour, which forms a radial guide of the plunger in the valve insert, and an axial recess, which has an overlap with the at least one equalization groove in the main body and is connected to the armature chamber via at least one radial recess.

Moreover, a magnet valve having a magnet subassembly and a valve cartridge of this kind is proposed, wherein an armature is movably guided within the valve cartridge, said armature being movable by a magnetic force produced by the magnet subassembly.

Advantageous improvements of the valve cartridge for a magnet valve which is indicated in the following description are possible by means of the measures and developments presented in the following description.

It is particularly advantageous that the main body can have a plurality of webs and equalization grooves, which each have an overlap with the axial recess. Moreover, a plurality of radial recesses, which can connect the axial recess to the armature chamber, can be formed in an armature contact surface of the plunger. The dimensions of the axial recess and the number and dimensions of the equalization grooves and of the radial recesses can advantageously be chosen and embodied in such a way that the requirements on the damping behavior and valve dynamics are satisfied or complied with.

In an advantageous embodiment of the valve cartridge for a magnet valve, the plunger can be embodied as an injection-molded plastic part, onto the main body of which a hollow cylinder having the cylindrical outer contour and the axial recess and the at least one radial recess can be molded. This enables particularly simple and low-cost production of the plunger for the valve cartridge.

In another advantageous embodiment of the valve cartridge for a magnet valve, the valve insert can be embodied as a low-cost single-part slotted sleeve. By way of example, the valve body can be embodied as a hood-shaped sleeve which is pressed into the second end of the valve insert in such a way that the primary valve seat is arranged within the valve insert.

An illustrative embodiment of the disclosure is shown in the drawing and is explained in greater detail in the following description.

DETAILED DESCRIPTION

Figure 1:
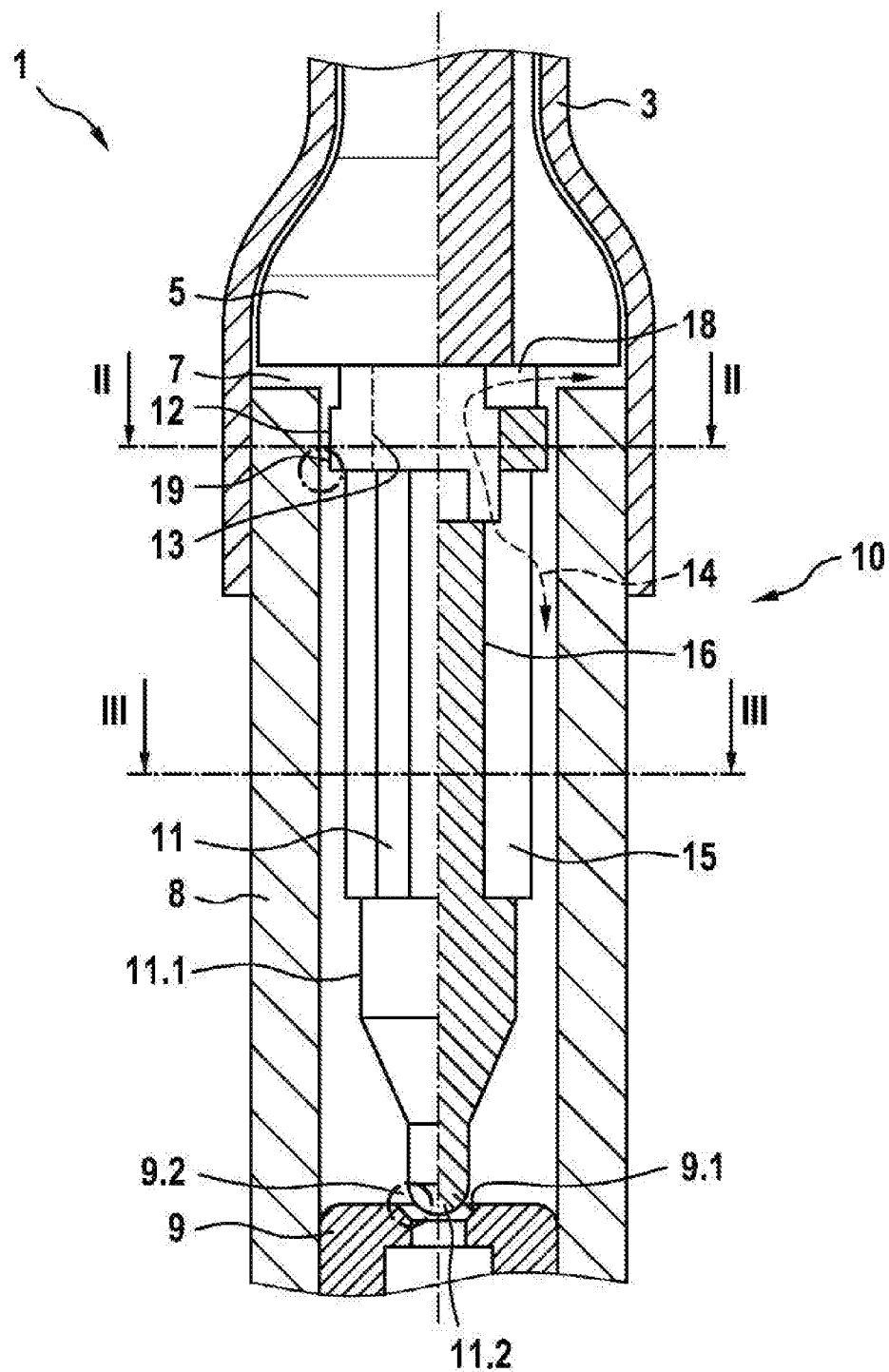
FIG. 1 shows a schematic sectional illustration of an illustrative embodiment of a valve cartridge for a magnet valve.
Figure 2:
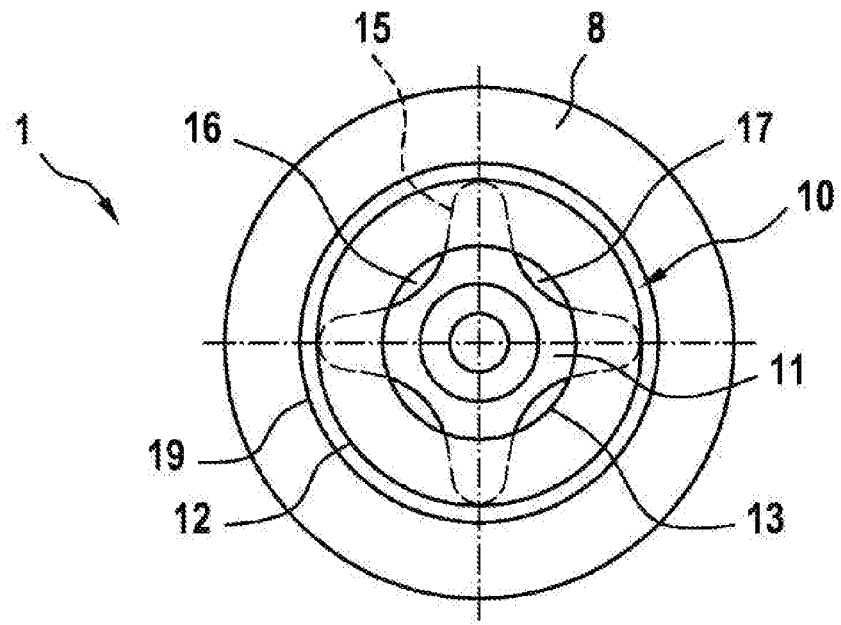
FIG. 2 shows a schematic sectional illustration of the illustrative embodiment of the valve cartridge for a magnet valve from FIG. 1 along section line II-II.
Figure 3:
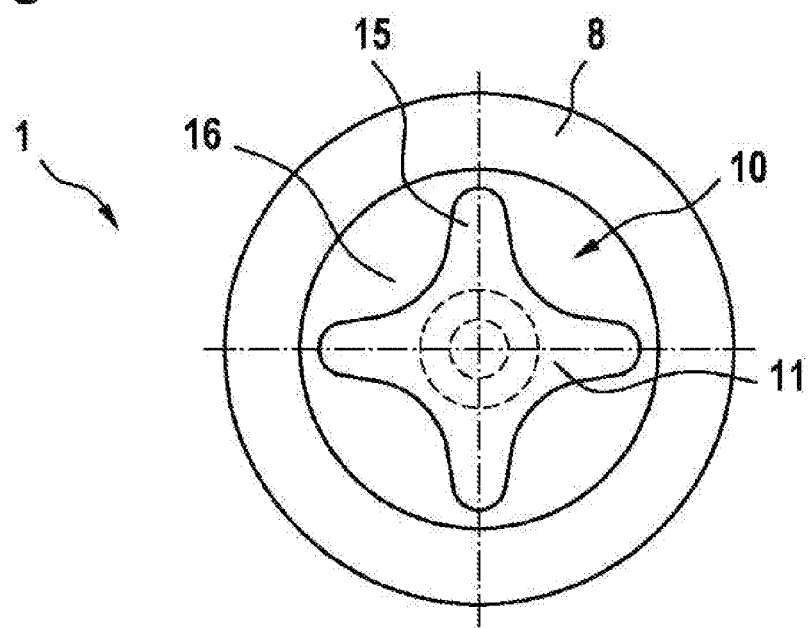
FIG. 3 shows a schematic sectional illustration of the illustrative embodiment of the valve cartridge for a magnet valve from FIG. 1 along section line III-III.
Figure 4:
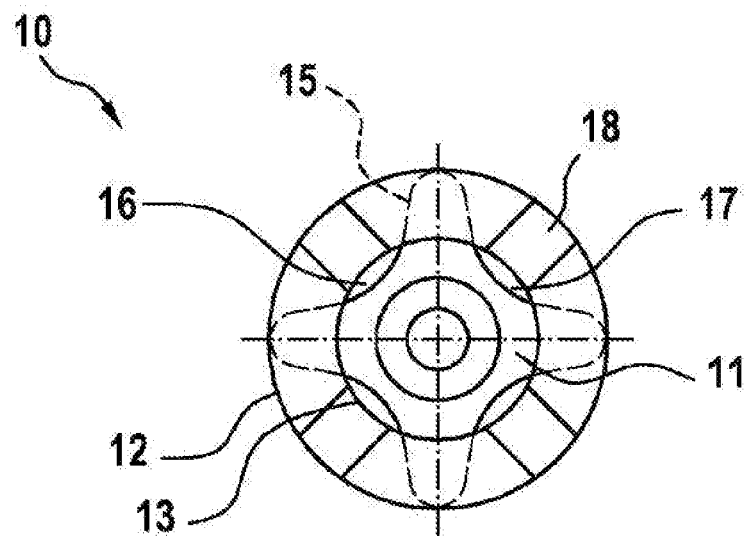
FIG. 4 shows a schematic plan view from above of an illustrative embodiment of a plunger of the valve cartridge for a magnet valve from FIG. 1.
Figure 5:
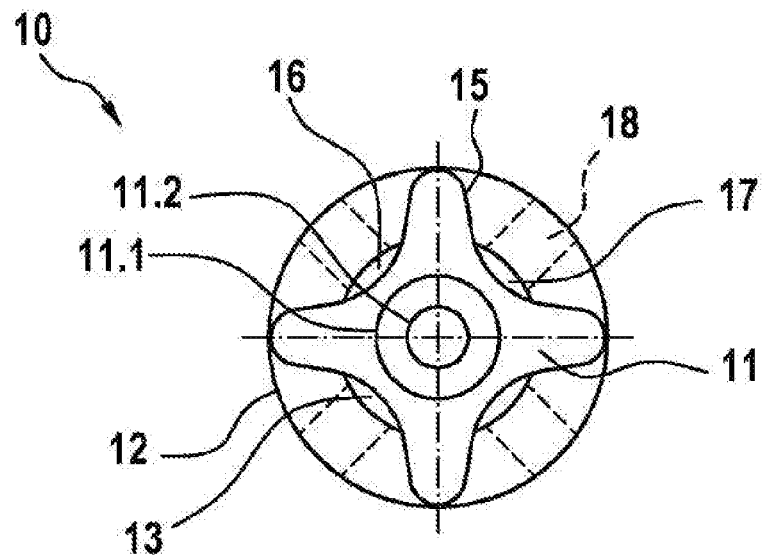
FIG. 5 shows a schematic plan view from below of an illustrative embodiment of a plunger of the valve cartridge for a magnet valve from FIG. 1.

As can be seen from FIGS. 1 to 5, the depicted illustrative embodiment of a valve cartridge 1 according to the disclosure for a magnet valve has a capsule 3, an armature 5, which is movably guided within the capsule 3, a hollow-cylindrical valve insert 8, a first end of which is inserted into the capsule 3, and a valve body 9 having a primary valve seat 9.1, which is inserted into a second end of the hollow-cylindrical valve insert 8. The armature 5 moves a plunger 10 guided within the valve insert 8, said plunger 10 having a main body 11 and a closing body 11.1 having a closing element 11.2, which plunges into the primary valve seat 9.1 of the valve body 9 in a sealing manner in order to carry out a sealing function. At least one equalization groove 16 is introduced into the main body 11 of the plunger 10, said groove enabling a volume equalization 14 between a sealing region 9.2 and an armature chamber 7. In this arrangement, the plunger 10 has, at its end facing the armature 5, an encircling cylindrical outer contour 12, which forms a radial guide 19 of the plunger 10 in the valve insert 8, and an axial recess 13, which has an overlap 17 with the at least one equalization groove 16 in the main body 11 and is connected to the armature chamber 7 via at least one radial recess 18.

As can furthermore be seen from FIGS. 1 to 5, the main body 11 of the plunger 10 in the embodiment depicted is embodied as a cloverleaf profile having four webs 15 and equalization grooves 16, which each have an overlap 17 with the axial recess 13. Of course, a different number of webs 16 and equalization grooves 16 can also be provided.

As can furthermore be seen from FIGS. 1 to 5, four radial recesses 18, which connect the axial recess 13 to the armature chamber 7, are formed in an armature contact surface of the plunger 10.

In the illustrative embodiment depicted, the plunger 10 is embodied as a low-cost injection-molded plastic part, onto the main body 11 of which a hollow cylinder having the cylindrical outer contour 12 and the axial recess 13 and the four radial recesses 18 is molded. The valve insert 8 is embodied as a single-part slotted sleeve. The valve body 9 is embodied as a hood-shaped sleeve, which is pressed into the second end of the valve insert 8 in such a way that the primary valve seat 9.1 is arranged within the valve insert 8. The valve body 9 can be produced as a deep-drawn part, for example.

Figure 6:
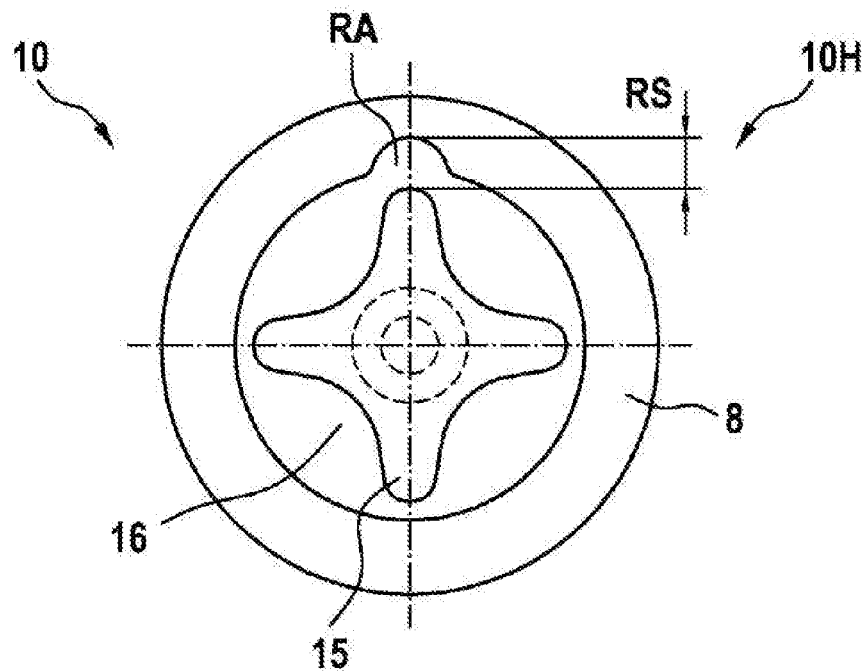
FIG. 6 shows a schematic sectional illustration in the region of the armature chamber of a conventional valve cartridge for a magnet valve, the valve insert of which has a partial deviation from circularity.
Figure 7:
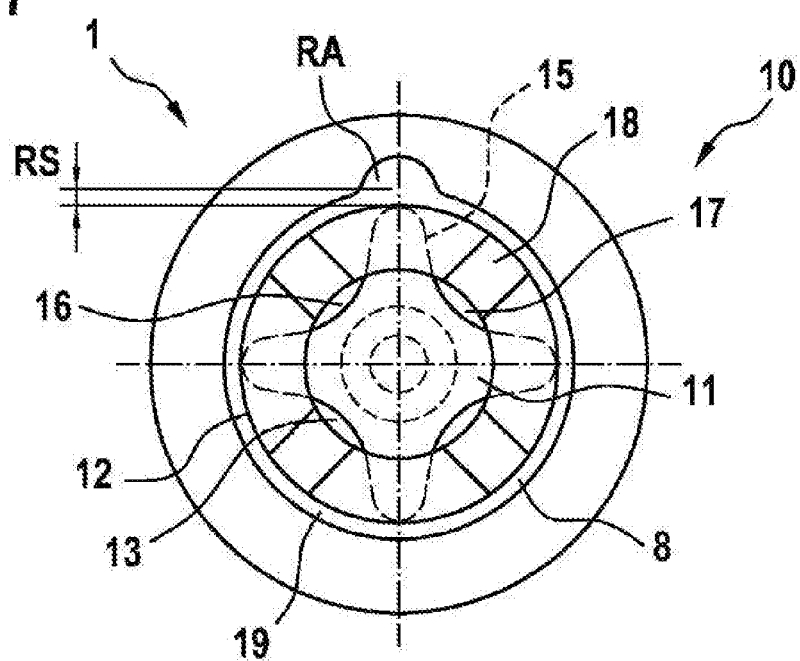
FIG. 7 shows a schematic sectional illustration in the region of the armature chamber of the valve cartridge for a magnet valve from FIG. 1, the valve insert of which has a partial deviation from circularity.

The recesses or equalization grooves 16 between the webs 15 are intended to ensure volume equalization 14 between the sealing region 9.1 and the armature chamber 7. In the case of a conventional valve cartridge 1H depicted in FIG. 6, the webs 15 themselves are intended to limit a tilting angle between the valve insert 8 and the plunger 10H. As long as the valve insert 8 has only small partial deviations RA from circularity, which are smaller than the web width in the circumferential direction, this is also effective. If the range of deviation RA from circularity is larger, the effective radial clearance RS of the plunger 10H is larger, and the plunger 10H of the conventional valve cartridge 1H can tilt locally to a greater extent at this location, as can be seen from FIG. 6. As can furthermore be seen from FIG. 7, the effective radial clearance RS of the plunger and hence the tilting of the plunger 10 in embodiments of a valve cartridge 1 according to the disclosure is limited by the molded-on cylindrical outer contour 12, even in the case of relatively large partial deviations RA from circularity. As a result, embodiments of the valve cartridge 1 according to the disclosure are more robust in relation to manufacturing tolerances. This applies, in particular, to the pressure adjustment accuracy, the variation thereof due to component tolerances, and reproducibility in one and the same valve cartridge 1.

The required volume equalization between the sealing region 9.2 and the armature chamber 7 is advantageously made possible by the cylindrical axial recess 13 and the radial recesses 18 in the armature contact surface of the plunger 10, which connect the axial recess 13 to the armature chamber 7.

The depicted illustrative embodiment of the valve cartridge 1 according to the disclosure can be used in a normally open magnet valve having a magnet subassembly, for example. In this case, the armature 5 movably guided within the valve cartridge 1 is moved by a magnetic force produced by the magnet subassembly (not shown specifically) in order to close the magnet valve, i.e. in order to push the closing element 11.2 into the primary valve seat 9.1. When the magnet subassembly is switched off, the plunger 10 is returned to the open position by a return spring (not shown specifically).

The invention claimed is:
1. A valve cartridge for a magnet valve, comprising:
a capsule;
an armature, which is movably guided within the capsule;
a hollow-cylindrical valve insert, a first end of which is inserted into the capsule; and
a valve body having a primary valve seat, which is inserted into a second end of the hollow-cylindrical valve insert, wherein:
the armature moves a plunger guided within the valve insert, said plunger having a main body and a closing body having a closing element, which plunges into the primary valve seat of the valve body in a sealing manner to carry out a sealing function,
at least one equalization groove is defined in the main body of the plunger, said at least one equalization groove enabling a volume equalization between a sealing region and an armature chamber, and the plunger has a first end region facing the armature, the first end region including (i) an encircling closed cylindrical outer contour, which forms a radial guide of the plunger in the valve insert, iii) an axial recess, which has an overlap with the at least one equalization groove in the main body, and (iii) at least one radial recess, which connects the axial recess to the armature chamber.

2. The valve cartridge as claimed in claim 1, wherein the main body has a plurality of webs, which separate equalization grooves of the at least one equalization groove, each equalization groove overlapping the axial recess.

3. The valve cartridge as claimed in claim 1, wherein:
the at least one radial recess includes a plurality of radial recesses defined extending axially into an armature contact surface of the plunger, and
the plurality of radial recesses connect the axial recess to the armature chamber.

4. The valve cartridge as claimed in claim 1, wherein:
the plunger is an injection-molded plastic part, and the cylindrical outer contour is formed by a hollow cylinder in which the axial recess is defined, and the at least one radial recess is molded onto the main body of the plunger.

5. The valve cartridge as claimed in claim 1, wherein the valve insert is a single-part slotted sleeve.

6. The valve cartridge as claimed in claim 1, wherein the valve body is a hood-shaped sleeve pressed into the second end of the valve insert such that the primary valve seat is arranged within the valve insert.

7. A magnet valve, comprising:
a magnet subassembly; and
a valve cartridge, the valve cartridge including:
a capsule;
an armature, which is movably guided within the capsule;
a hollow-cylindrical valve insert, a first end of which is inserted into the capsule; and
a valve body having a primary valve seat, which is inserted into a second end of the hollow-cylindrical valve insert,
wherein:
the armature is configured to be moved by a magnetic force produced by the magnet subassembly,
the armature moves a plunger guided within the valve insert, said plunger having a main body and a closing body having a closing element, which plunges into the primary valve seat of the valve body in a sealing manner to carry out a sealing function,
at least one equalization groove is defined in the main body of the plunger, said at least one equalization groove enabling a volume equalization between a sealing region and an armature chamber, and
the plunger has a first end region facing the armature, the first end region including (i) an encircling closed cylindrical outer contour, which forms a radial guide of the plunger in the valve insert, (ii) an axial recess, which has an overlap with the at least one equalization groove in the main body, and (iii) at least one radial recess, which connects the axial recess to the armature chamber.

8. The valve cartridge as claimed in claim 1, wherein the axial recess extends through the encircling cylindrical outer contour such that at least a portion of the axial recess is surrounded by the encircling cylindrical outer contour.

9. The valve cartridge as claimed in claim 1, wherein the axial recess extends through a central longitudinal axis of the plunger.

* * * * *